A. J. Laird.
Horse Hay-Fork.
Nº 57337
Patented Aug. 21, 1866.
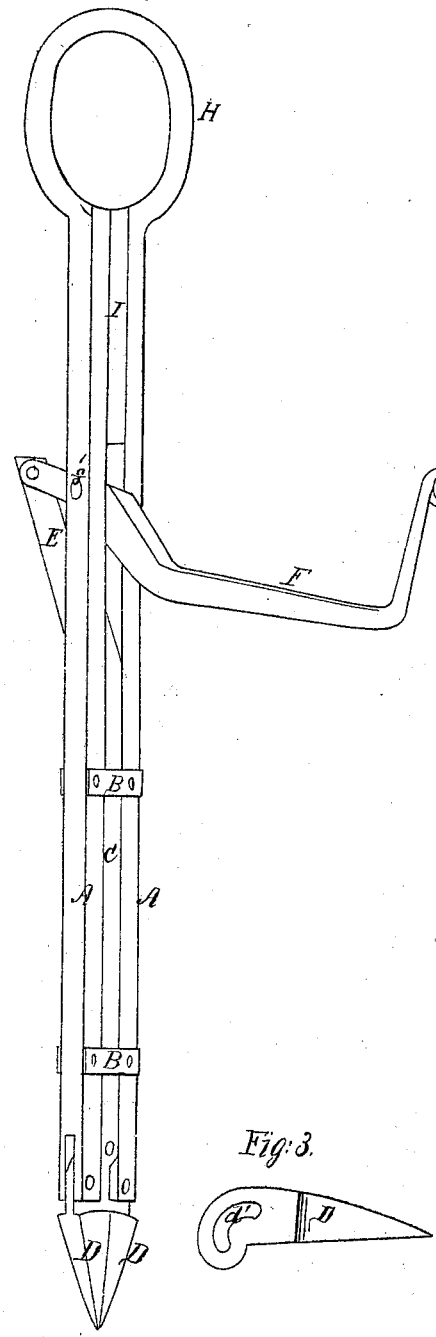
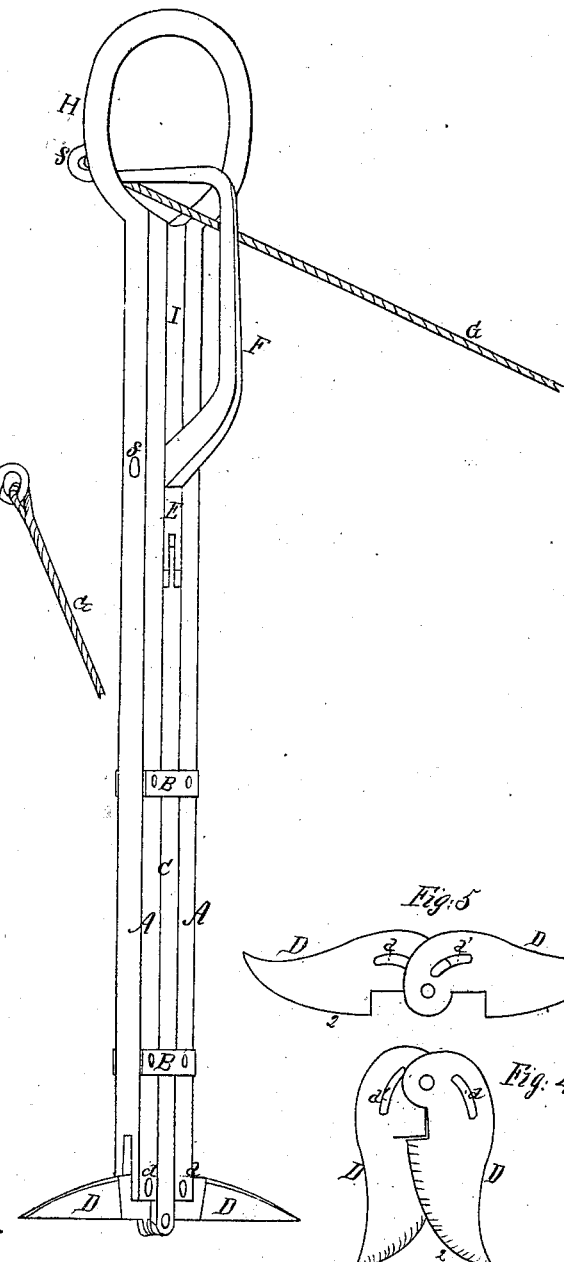
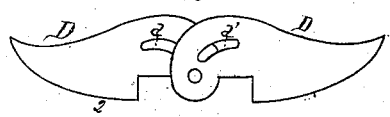
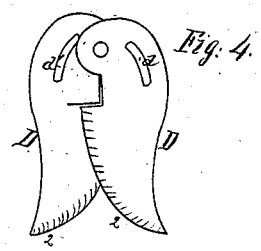
Witnesses
Inventor
A. J. Laird,
By Munn & Co
Attorneys

UNITED STATES PATENT OFFICE.

ANDREW J. LAIRD, OF MIDDLETOWN, PENNSYLVANIA.

IMPROVEMENT IN HORSE HAY-FORKS.

Specification forming part of Letters Patent No. 57,337, dated August 21, 1866.

*To all whom it may concern:*

Be it known that I, ANDREW J. LAIRD, of Middletown, in the county of Dauphin and State of Pennsylvania, have invented a new and useful Improvement in Hay-Forks; and I do hereby declare the following to be a full, clear, and exact description of the nature, construction, and operation of the same, reference being had to the accompanying drawings, which are made a part of this specification, and in which—

Figure 1 is a perspective view, showing the implement in readiness to be probed into the hay. Fig. 2 is a similar view, showing the implement in readiness to hoist the hay. Fig. 3 is a detached view of the tine. Figs. 4 and 5 illustrate a modification in the form of the tines.

Similar letters of reference indicate corresponding parts in the different figures.

This invention relates to a hay-elevating fork in which two tines are adapted to be brought together so as to form a penetrating-point to adapt the implement to be readily inserted into the hay or straw and then opened out so as to form points of support on which the hay is lifted.

The novelty consists in a peculiar method of combining a sliding bar and lever with the tines, the advantages of which will be hereinafter specified.

In order that others skilled in the art to which my invention appertains may be enabled to fully understand and use the same, I will proceed to describe it in detail, in connection with the accompanying drawings.

A A may represent two parallel bars of equal length, connected together by the cross pieces or straps B B. C is a sliding rod, which moves up or down between the bars A A and is guided by the straps B B. The lower end of the rod C is jointed to the upper or flattened extremities of the tines D D, which fit within the slotted ends of the bars A A and are connected thereto by pins or pivots $d\ d$. These pins or pivots pass through segmental slots $d'\ d'$, which are formed in the tines D D for the purpose of adapting the latter to freely swing outward or inward in the arc of a circle, in order to open and close under the impulse of the rod C. These slots are necessary, under the construction here represented, in order to adapt the tines to freely conform to the position of the sliding rod C, and said slots form one of the features of this invention.

The upper end of the sliding rod C is jointed to a link or connecting-rod, E, which, in turn, is jointed to a lever, F, which is formed with an eye, $f$, for the attachment of a rope, G, whereby the lever F is operated so as to close the tines, as will be presently explained.

H is a ring formed on or secured to the upper extremities of the bars A A, and constituting the point of attachment for a rope, whereby the implement is raised and lowered, said rope running over a pulley or pulleys and connected with any suitable power.

A bar, I, set in between the bars A A at their upper ends, serves as a stop or bearing for the lever F when in its closed condition.

The operation may be briefly explained. The lever F is pivoted to the bars A A at $f'$, and when the bar C is depressed and the tines D D open the body or main part of the lever stands parallel with the bars A A, while the upper horizontal arm of the lever F projects through the ring H. The attached end of the rope G passes through the ring H with the horizontal arm of the lever F when the tines are open, as represented. Now, it will be observed that when the tines are open the three movable parts C E F—that is to say, the sliding rod, the intermediate link, and the lever—all stand in line or parallel with each other, and a very slight movement of the lever F will suffice to throw these parts out of line with each other by throwing the jointed connection between the link E and lever F beyond the center of the rod C. When the parts are thus thrown out of line it is manifest that the weight of the hay which is suspended by the tines D D will continue to raise the sliding rod C, and thus allow the tines to close and discharge the hay. The implement is then ready to be reinserted; after which the tines may be opened by the application of the hand to the lever F. The object in having the horizontal arm of the lever F project through the ring H, together with the attached end of the rope G, is that the latter is thereby rendered capable of moving the lever in the desired direction under any position which the implement may assume in being elevated—as, for instance, the rotary movement of the implement in being elevated may turn the eye $f$ on the opposite side of the implement from the operator, in which case the rope G, acting from its point of bearing upon the ring H, will move the lever F in the same direction as if the eye $f$ were presented toward the operator. This action is the same whether the implement be wholly or partially turned around during its elevation. By this simple arrangement the operator is enabled to close the tines at the proper moment without changing his position.

The operation of the implement may be improved and facilitated by the employment of tines of the form represented in Figs. 4 and 5, such tines having cutting-edges 2 2, to adapt them to more readily penetrate the hay. Fig. 4 shows these tines in position to be probed into the hay, and Fig. 5 shows them in position to be hoisted up. These tines in themselves are not claimed here; but my invention may be carried out in connection therewith or with tines of any analogous construction.

Having thus described my invention, the following is what I claim as new herein and desire to secure by Letters Patent:

1. In combination with a sliding rod, C, the lever F, with its upper horizontal arm adapted to project through the ring H, substantially as described and for the purpose specified.

2. The combination of the bars A A, sliding rod C, tines D D, link or connecting-rod E, and lever F, all arranged and operating substantially as described.

ANDREW J. LAIRD.

Witnesses:
I. SCHAEFFER,
JACOB S. KEYSER.